United States Patent
Gee

(10) Patent No.: US 7,064,686 B2
(45) Date of Patent: Jun. 20, 2006

(54) METHOD OF DETERMINING A DATA RATE AND APPARATUS THEREFOR

(76) Inventor: David Martin Gee, Agilent Technologies Uk Limited, White House Road, Ipswich I91 5PB (GB)

(*) Notice: Subject to any disclaimer, the term of this patent is extended or adjusted under 35 U.S.C. 154(b) by 0 days.

(21) Appl. No.: 11/014,250

(22) Filed: Dec. 17, 2004

(65) Prior Publication Data

US 2005/0165579 A1    Jul. 28, 2005

(30) Foreign Application Priority Data

Jan. 6, 2004    (GB) .................................... 0400134

(51) Int. Cl.
    *H03M 7/00*    (2006.01)

(52) U.S. Cl. ........................................ 341/61; 375/225

(58) Field of Classification Search .................. 341/61, 341/143, 50; 375/225, 326
See application file for complete search history.

(56) References Cited

U.S. PATENT DOCUMENTS

| | | | |
|---|---|---|---|
| 6,097,754 A | 8/2000 | Fitch et al. | |
| 6,680,970 B1 * | 1/2004 | Mejia | 375/225 |
| 6,717,447 B1 * | 4/2004 | Le et al. | 327/161 |
| 2003/0223522 A1 * | 12/2003 | Fukushima | 375/354 |
| 2005/0201491 A1 * | 9/2005 | Wei | 375/326 |

FOREIGN PATENT DOCUMENTS

WO    WO 03/010935    2/2003

* cited by examiner

*Primary Examiner*—Peguy JeanPierre

(57) ABSTRACT

A data rate determination apparatus includes an edge detection and clock generation circuit for receiving an input bit stream. The edge detection and clock generation circuit generates a pulse for each edge detected in the input bit stream. The pulses are passed to a programmable re-triggerable monostable multivibrator circuit coupled to a binary counter, which counts how many pulses are received within a time period determined by the number of pulses received at a rate higher than a predetermined rate. The binary counter is coupled to a Gray code counter coupled to a processing unit. The processing unit uses different counts that are accumulated over different sampling periods with different predetermined rates to establish statistical data, which can be compared to known data for different data rate standards or formats.

19 Claims, 1 Drawing Sheet

METHOD OF DETERMINING A DATA RATE AND APPARATUS THEREFOR

RELATED APPLICATIONS

The present application is based on, and claims priority from GB Application Number 0400134.3, filed Jan. 6, 2004, the disclosure of which is hereby incorporated by reference herein in its entirety

FIELD OF INVENTION

The present invention related to a method of determining a rate of a data signal, for example, of the type corresponding to an optical data signal for communicating data in an optical communications network. The present invention also relates to an apparatus for determining the rate of the data signal.

BACKGROUND OF INVENTION

In the field of optical communications, optoelectronic modules typically comprise a transmitter and a receiver module. Overall, an optoelectronic module is currently designed to provide optimum performance at a single data rate, for example, 2.5 Gbps. In this particular context, optimal performance is considered to be configuration of operating characteristics of the receiver module to produce a longest achievable transmission distance at the single data rate. However, such optoelectronic modules are also capable of providing sub-optimal performance at other data rates, for example 1.25 Gbps. It is possible to optimise performance of the receiver module for the other data rates in order to provide a longest possible transmission distance for each data rate desired.

In providing the possibility of operating the optoelectronic module at different data rates, a need to determine the data rate of received signals follows. In the context of the OSI communications model, known data rate sensing techniques are typically carried out at a higher level than the physical level by detecting packets or bytes containing balanced data. However, such techniques require the use of a considerable quantity of additional circuitry running at the data rate to be identified, and almost inevitably result in unacceptably high power demands and design complexity. Additionally, such detection techniques are usually dedicated to a particular data format and so modification of the detection technique is required for different data formats, for example Synchronous Optical NETwork (SONET), Ethernet or Fibre Channel (FC) system signals, communicated through an optical communications network employing multi-data rate optoelectronic modules.

As an alternative to automatic data rate recognition, the data rate at which the receiver module operates can be set manually from an external source, for example via a hardware connector Input/Output (I/O) line or a software register or memory address. In many known systems the host, which is the source of the data signal, identifies the data rate and transmits that information to the receiver module, at which operation is to take place. For example, the host could extract the datarate from information coded at a higher level in the data packets—such as particular pre agreed bit sequences, otherwise known as a training sequence. Alternatively both ends of a link could start-up in the lowest data rate mode, establish a link and then have an agreed protocol to test the link at higher and higher rates until the maximum usable rate is identified. All these type of systems require the host to tell the receiver module what rate to run at, so the host is the controlling party, not the receiver module.

SUMMARY OF INVENTION

Accordingly, in a first aspect, the present invention provides a method of determining a data rate of a bit stream, the method comprising the steps of receiving the bit stream, and processing at least part of the bit stream to determine the data rate of the bit stream; the processing of the at least part of the bit stream comprises the steps of decimating the at least part of the bit stream, generating statistical data relating to the decimated at least part of the bit stream, and analysing the statistical data to determine the data rate of the bit stream.

The step of decimating the at least part of the bit stream may comprise counting edges of the at least part of the bit stream.

The step of decimating the at least part of the bit stream may comprise integration of the at least part of the bit stream. Alternatively, the step of decimating the at least part of the bit stream may comprise low-pass filtering the at least part of the bit stream.

The step of generating statistical data may comprise the step of calculating frequencies of occurrence of data edges within a first predetermined period of time. The step of decimating the at least part of the bit stream may comprise counting edges in the at least part of the bit stream over a second period of time, counting the edges in the at least part of the bit stream over the first period of time, the first period of time being shorter than and within the second period of time, and determining a proportion of successive edges of the at least part of the bit stream occurring within the first period of time.

The method may further comprise the step of dynamically modifying the first period of time. Gray code may be employed to count the edges.

The step of decimating the at least part of the bit stream may comprise the steps of decimating at least a first part of the bit stream using a first decimation parameter, and decimating at least a second part of the bit stream using a second decimation parameter.

The first and second decimation parameters may determine different periods of time over which the bit stream is decimated.

According to a second aspect, the invention provides a measurement apparatus for measuring a data rate of a bit stream comprising a receiver for receiving the bit stream, and a processing unit arranged to process at least part of the bit stream to determine the data rate of the bit stream, a data decimation unit for decimating the at least part of the bit stream, and the processing unit being further arranged to generate statistical data relating to the at least part of the bit stream decimated by the data decimation unit, and to analyse the statistical data.

Preferably, the processing unit is arranged to determine the data rate of the bit stream based on the analysis thereby of the statistical data.

The data decimation unit may comprise a monostable multivibrator coupled to a counter so as to count, when in use, edges of the at least part of the bit stream.

The counter may be clocked, when in use, by the at least part of the bit stream.

The data decimation unit may comprise an integrator for integrating the at least part of the bit stream with respect to time.

The data decimation unit may alternatively comprise a low-pass filter for filtering the at least part of the bit stream.

The processing unit may be further arranged to calculate frequencies of occurrence of data edges within a first predetermined period of time.

The decimation unit may be arranged to count edges in the at least part of the bit stream over a second period of time, and count the edges in the at least part of the bit stream over the first period of time, the first period of time being shorter than and within the second period of time; and determine a proportion of successive edges of the at least part of the bit stream occurring within the first period of time.

The processing unit may be further arranged to dynamically modify the first period of time.

The apparatus may further comprise a Gray code counter for counting the edges.

It is thus possible to provide a method of determining a data rate and a method therefore that requires minimal use of additional high-speed, power hungry, expensive circuitry. Additionally, external intervention to set the data rate is avoided and knowledge of the format of the data being transmitted is not required.

BRIEF DESCRIPTION OF THE DRAWING

At least one embodiment of the invention will now be described, by way of example only, with reference to the accompanying drawings, in which:

The sole FIGURE is a circuit diagram of a data rate determination apparatus constituting a first embodiment of the invention.

DETAILED DESCRIPTION OF THE DRAWING

Figure 1:
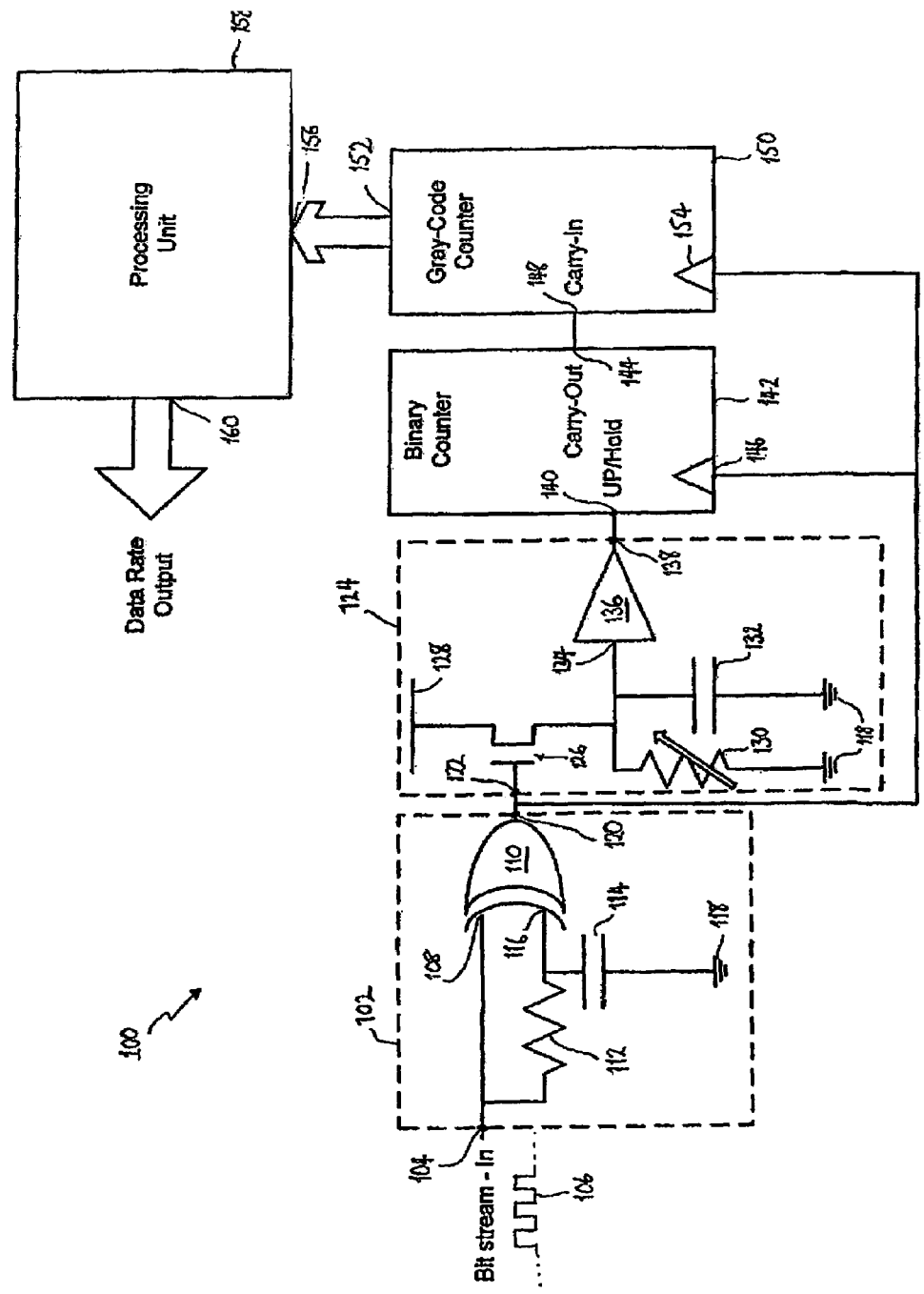

Throughout the following description, identical reference numerals will be used to identify like parts.

Referring to the figure, a data rate determination apparatus 100 comprises an edge detection and clock generation circuit 102 comprising an input terminal 104 for receiving a bit stream 106. The input terminal 104 is coupled to a first input terminal 108 of an Exclusive OR (XOR) logic gate 110, and a first terminal of a resistor 112. A second terminal of the resistor 112 is coupled to a first terminal of a first capacitor 114 and a second input terminal 116 of the XOR logic gate 110. A second terminal of the first capacitor is coupled to ground potential 118.

An output terminal of the XOR logic gate 110 constitutes an output terminal 120 of the edge detection and clock generation circuit 102 and is coupled to an input terminal 122 of a programmable re-triggerable monostable multivibrator circuit 124. The monostable multivibrator circuit 124 comprises an n-channel field effect transistor (FET) 126 having a gate terminal coupled to the input terminal 122 of the programmable re-triggerable monostable multivibrator circuit 124. A drain terminal of the FET 126 is coupled to a voltage supply rail 128, and a source terminal of the FET 126 is coupled to a first terminal of a variable resistor (or a digital potentiometer) 130 and a first terminal of a second capacitor 132, as well as an input terminal 134 of a buffer 136. A second terminal of the variable resistor 130 and a second terminal of the second capacitor 132 are coupled to ground potential 118. An output terminal of the buffer 136 constitutes an output terminal 138 of the programmable re-triggerable monostable multivibrator circuit 124.

The output terminal 138 of programmable re-triggerable monostable multivibrator circuit 124 is coupled to a count-up/hold terminal 140 of a binary counter 142. The binary counter 142 comprises a carry-out terminal 144 and a clocking input terminal 146, the clocking input terminal 146 being coupled to the output terminal 120 of the edge detection and clock generation circuit 102.

The carry-out terminal 144 is coupled to a carry-in terminal 148 of a Gray code counter 150. The Gray code counter 150 comprises a databus output 152 and a clocking input terminal 154, the clocking input terminal 154 being coupled to the output terminal 120 of the edge detection and clock generation circuit 102.

The databus output 152 is coupled to a first databus input 156 of a processing unit 158, such as a microcontroller, the processing unit 158 having a databus output 160.

In operation, the bit stream 106 is received at the first input terminal 104 and the edge detection and clock generation circuit 102 generates a pulse in response to each edge (both rising and falling) of the bit stream 106. The bit stream 106 is input to the first input terminal 108 of the XOR gate and is delayed slightly by the RC circuit formed by the resistor 112 and capacitor 114 before passing to the second input terminal 116 of the XOR gate. Consequently, the XOR gate receives each edge of the bit stream 106 at both input terminals, but with the edges at the second input terminal being slightly delayed as compared to the first input terminal. Since the property of the XOR gate is that it provides a high whenever its two inputs are different, it generates a pulse whenever an edge occurs in the input bit stream to generate a stream of pulses (one for each edge of the input bit stream.

This stream of pulses from the edge detection and clock generation circuit 102 is used to trigger the monostable multivibrator circuit 124 having a predetermined hold time controlled by the variable resistor 130 and the second capacitor 132. Thus, in response to a pulse at the input terminal 122, the FET 126 causes a signal to appear on the input terminal 134 of buffer 136. In response to the FET 126 being switched off, the signal decays via the resistor 130 in a time set by the values of the resistor 130 and the capacitor 132, as is well known. The buffer 136 essentially comprises a comparator that compares the signal level at the input terminal 134 with a preset threshold and provides a digital output signal indicating whether the signal is above or below the threshold. Therefore, in response to a first pulse being received at the input terminal 122 of monostable multivibrator circuit 124, the FET 126 is switched on to produce a signal at the input terminal 134 of the buffer 136, thereby producing a leading edge of the stretched pulse at the output terminal 138 of the monostable multivibrator circuit 124. In response to a following pulse arriving at the input terminal 122 of the monostable multivibrator circuit 124 before the signal level at the input terminal 134 of buffer 136 decays below the threshold, the signal is "refreshed" and the stretched pulse at the output terminal 138 is maintained and "stretched" further. On the other hand, in response to the signal level at the input terminal 134 of buffer 136 decaying below the threshold before another pulse is received at the input terminal 122 of the monostable multivibrator circuit 124, the stretched pulse at the output terminal 138 is terminated. Thus, the length of the stretched pulse is dependent on how many pulses arrive in the stream of pulses at the input terminal 122 of the monostable multivibrator circuit 124 without the signal level at the input terminal 134 of the buffer 136 having decayed below the threshold, the decay rate being determined by the values of the variable resistor 130 and the capacitor 132.

The stretched pulse generated by the monostable multivibrator circuit 124 is applied to the count-up/hold terminal 140 of the binary counter 142. Since the binary counter 142 is clocked at the rate of the output of the edge detection and clock generation circuit, if a bit edge occurs in the stream of pulses output from the edge detection and clock generation circuit 102 while a stretched pulse is applied to the binary counter 142, the binary counter 142 is incremented by one. In other words, if the next edge is detected before the end of the stretched pulse, the counter is incremented because the stretched pulse enables the counter while it is high, and the counter counts every new edge occurring within the stretched pulse.

Each time a carry-out bit is generated by the binary counter 142, the Gray code counter 150 is incremented by unity by changing only a single bit, thereby reducing reading errors that can occur between the Gray code counter 150 and the processing unit 158. Consequently, the processing unit 158 is provided with a count of the number of edges in the bit stream 106 that have occurred over a first predetermined period of time controlled by the values of the variable resistor 130 and the capacitor 132. The input bit stream 106 has therefore been decimated in that that the processing unit is provided with an indication of the number of bits in the bit stream that are closer together (have a data rate higher) than a predetermined rate (set by the predetermined period of time).

If, then, the predetermined rate (set by the predetermined period of time) is changed to a second, different, rate (by a second, different, predetermined period of time), the processing unit will be provided with an indication of the number of bits in the bit stream that are closer together (have a data rate higher) than that second predetermined rate. The two indications of data rates can then be used by the processing unit to generate statistical data, which can be used to try to determine the data rate of the signal based on predetermined knowledge of particular possible data rates for different standards or systems.

In order to provide the second predetermined period of time, the variable resistor can be controlled by the processing unit so as to change the RC characteristics of the monostable multivibrator circuit 124 and therefore the decay rate.

The processing unit 158 is therefore provided with a first count of a number of successive edges of the bit stream 106 occurring within the first predetermined period of time, and a second count of a number of successive edges of the bit stream 106 occurring during the second predetermined period of time. Thus, as the stretch pulse length is changed the number of edge pairs occurring closer than the stretch length varies. Recording or plotting the number of close edge pairs in a unit time interval against the stretch length gives a characteristic signature for the data on the link, which can be compared with known characteristics of different standards or formats. This gives a more powerful overview of the data than simply counting only the total number of data edges in a given time. The shape of the data can show not only the average number of edges per second, but also the length of a databit. As the stretched pulse is made narrower than a databit, a clean signal, with little noise, has a distinctive cliff edge on the data statistics, as the count value rapidly falls to zero. How rapidly it falls to zero at this cliff edge gives an indication of the noise and jitter on the link. All this is information that a straight edge density measurement can not provide alone. However, by setting the stretch to infinity (always on) the same circuit can also issue the straight edge density measurement—but rather than being an isolated measurement point it becomes, in this system, simply the limiting case of the more general edge spacing measurement. Hence such statistics indicate a great deal about the signal on the link. The advantage of this circuit is that all this information can be easily harvested by a microcontroller running at a system clock rate thousands of times slower than the data stream it is monitoring.

Thus, this circuit provides an indication of how many edges in a given time occur at spacings of less then the stretch length from the previous edge. If the same data edges are also tested against the circuit with a longer stretched pulse length, there is a higher counter value in the same elapsed time. Provided the data is truly random, one circuit can be used and the test repeated for different stretch lengths, being careful to count over the same time interval. However, if answers are required more quickly, or the data is not always random, it may be preferable to have one or more copies of the circuit set to different time delays.

Therefore, instead of having a variable resistor 130, the resistor can be fixed and a parallel circuit is provided comprising a second, similar, edge detection and clock generation circuit coupled to a second, similar, monostable multivibrator circuit. The monostable multivibrator circuit is coupled to a second, similar, binary counter and a second, similar, Gray code counter. The Gray code counter is coupled to a second databus input of the processing unit 158. In this case, the decay rate of the monostable multivibrator circuit is changed by changing the value of one or both of the resistor and/or capacitor.

If desired, a still further parallel circuit set to a still different decay rate could be provided.

In an alternative embodiment, the processing unit 158 averages the edge count over a large number of bits and so a normal binary counter can be provided for the 8 least significant bits (LSBs) and a Gray code counter for the 8 most significant bits (MSBs). In such an arrangement, the processing unit can, if desirable for computational efficiency, simply read the 8 MSBs and disregard the 8, non-Gray-Code, LSBs.

Thus, in the described embodiment, a data rate determination apparatus 100 includes an edge detection and clock generation circuit 102 for receiving an input bit stream 106. The edge detection and clock generation circuit 102 generates a pulse for each edge detected in the input bit stream. The pulses are passed to a programmable re-triggerable monostable multivibrator circuit 124 coupled to a binary counter 142, which counts how many pulses are received within a time period determined by the number of pulses received at a rate higher than a predetermined rate. The binary counter 142 is coupled to a Gray code counter 150 coupled to a processing unit 158. By performing the count over different sampling periods with different predetermined rates, the counts can be used by the processing unit to establish statistical data, which can be compared to known data for different data rate standards or formats.

It will be appreciated that although only one particular embodiment of the invention has been described in detail, various modifications and improvements can be made by a person skilled in the art without departing from the scope of the present invention.

The invention claimed is:

1. A method of determining a data rate of a bit stream, the method comprising the steps of:
   receiving the bit stream; and
   processing at least part of the bit stream to determine the data rate of the bit stream;
   the processing of the at least part of the bit stream comprises the steps of;
   decimating the at least part of the bit stream;

generating statistical data relating to the decimated at least part of the bit stream; determining the data rate of the bit stream by analysing the statistical data wherein the step of decimating the at least part of the bit stream comprises:

counting edges in the at least part of the bit stream over a second period of time;

counting the edges in the at least part of the bit stream over the first period of time, the first period of time being shorter than and within the second period of time; and determining a proportion of successive edges of the at least part of the bit stream occurring within the first period of time.

2. A method as claimed in claim 1, wherein the step of decimating the at least part of the bit stream comprises:
integrating the at least part of the bit stream.

3. A method as claimed in claim 1, wherein the step of decimating the at least part of the bit stream comprises:
low-pass filtering the at least part of the bit stream.

4. A method as claimed claim 1, wherein the step of generating statistical data comprises the step of:
calculating frequencies of occurrence of data edges within a first predetermined period of time.

5. A method as claimed claim 1, wherein the step of generating statistical data comprises the step of:
calculating frequencies of occurrence of data edges within a first predetermined period of time.

6. A method as claimed in claim 1, wherein Gray code is employed to count the edges.

7. A method of determining a data rate of a bit stream, the method comprising the steps of:
receiving the bit stream; and
processing at least tart of the bit stream to determine the data rate of the bit stream;
the processing of the at least part of the bit stream comprises the steps of:
generating statistical data relating to the decimated at least part of the bit stream calculating frequencies of occurrence of data edges within a first period of time, the statistical data generating steps including:
decimating the at least part of the bit stream;
determining the data rate of the bit stream by analyzing the statistical data; and
dynamically modifying the first period of time.

8. A method of determining a data rate of a bit stream, the method comprising the steps of:
receiving the bit stream; and
processing at least part of the bit stream to determine the data rate of the bit stream;
the processing of the at least part of the bit stream comprises the steps of:
decimating the at least part of the bit stream;
generating statistical data relating to the decimated at least part of the bit stream;
determining the data rate of the bit stream by analysing the statistical data; and
the step of decimating the at least part of the bit stream comprising the steps of:
decimating at least a first part of the bit stream by using a first decimation parameter; and
decimating at least a second part of the bit stream by using a second decimation parameter.

9. A method as claimed in claim 8, further comprising decimation parameters determining different periods of time over which the bit stream is decimated by using the first and second decimation parameters.

10. A measurement apparatus for measuring a data rate of a bit stream comprising:
a receiver for receiving the bit stream;
a processing unit arranged to process at least part of the bit stream to determine the data rate of the bit stream;
a data decimation unit for decimating the at least part of the bit stream; and
the processing unit being arranged to generate statistical data relating to the at least part of the bit stream decimated by the data decimation unit, and to analyze the statistical data,
wherein the data decimation unit comprises a monostable multivibrator coupled to a counter for counting edges of the at least part of the bit stream.

11. An apparatus claimed in claim 10, wherein the processing unit is arranged in order to determine the data rate of the bit stream based on the analysis thereby of the statistical data.

12. An apparatus as claimed in claim 11, wherein the processing unit is further arranged to calculate frequencies of occurrence of data edges within a first predetermined period of time.

13. An apparatus as claimed in claim 10, wherein the counter is arranged to be clocked by the at least part of the bit stream.

14. An apparatus as claimed in claim 10, wherein the data decimation unit comprises an integrator for integrating the at least part of the bit stream with respect to time.

15. An apparatus as claimed in claim 10, wherein the data decimation unit comprises a low-pass filter for filtering the at least part of the bit stream.

16. An apparatus as claimed in claim 10, wherein the processing unit is further arranged to calculate frequencies of occurrence of data edges within a first predetermined period of time.

17. An apparatus as claimed in claim 16, further comprising a Gray code counter for counting the edges.

18. A measurement apparatus for measuring a data rate of a bit stream comprising:
a receiver for receiving the bit stream;
a processing unit arranged to process at least part of the bit stream to determine the data rate of the bit stream;
data decimation unit for decimating the a least part of the bit stream; and
the processing unit being arranged to generate statistical data relating to the at least part of the bit stream decimated by the data decimation unit, to analyze the statistical data to determine the data rate of the bit stream based on the analysis of the statistical data, and to calculate frequencies of occurrence of data edges within a first predetermined period of time,
the decimation unit arranged to a count edges in the at least part of the bit stream over a second period of time, and count the edges in the at least part of the bit stream over the first period of time, the first period of time being shorter than and within the second period of time, and (b) determine a proportion of successive edges of the at least part of the bit stream occurring within the first period of time.

19. An apparatus as claimed in claim 18, wherein the processing unit is further arranged to dynamically modify the first period of time.

* * * * *

UNITED STATES PATENT AND TRADEMARK OFFICE
CERTIFICATE OF CORRECTION

| | | |
|---|---|---|
| PATENT NO. | : 7,064,686 B2 | Page 1 of 1 |
| APPLICATION NO. | : 11/014250 | |
| DATED | : June 20, 2006 | |
| INVENTOR(S) | : David Martin Gee | |

It is certified that error appears in the above-identified patent and that said Letters Patent is hereby corrected as shown below:

Title Page, Column 1 item 76 (Inventor), Line 3, delete "I91" and insert -- IP1 --;

Column 1, Line 9 (approx), after "entirety" insert -- . --;

Column 6, Line 66, Claim 1, delete "steps of;" and insert -- steps of: --;

Column 7, Line 34, Claim 7, delete "tart" and insert -- part --;

Column 8, Line 45, Claim 18, before "data decimation" insert -- a --;

Column 8, Line 45, Claim 18, delete "a least" and insert -- at least --;

Column 8, Line 55, Claim 18, after "unit" insert -- being --;

Column 8, Line 55, Claim 18, before "count" delete "a" and insert -- (a) --.

Signed and Sealed this

First Day of June, 2010

David J. Kappos
*Director of the United States Patent and Trademark Office*